(12) United States Patent
Eilenstein et al.

(10) Patent No.: US 6,695,555 B2
(45) Date of Patent: Feb. 24, 2004

(54) PNEUMATICALLY ACTUATED FREIGHT LOADING SYSTEM FOR AN AIRCRAFT

(75) Inventors: Wilfried Eilenstein, Stuhr (DE); Hartmut Sempert, Hude (DE)

(73) Assignee: Airbus Deutschland GmbH, Hamburg (DE)

( * ) Notice: Subject to any disclaimer, the term of this patent is extended or adjusted under 35 U.S.C. 154(b) by 290 days.

(21) Appl. No.: 09/742,800

(22) Filed: Dec. 20, 2000

(65) Prior Publication Data

US 2003/0044254 A1 Mar. 6, 2003

(30) Foreign Application Priority Data

Dec. 21, 1999 (DE) .......................................... 199 61 734

(51) Int. Cl.[7] ................................................. B60P 7/08
(52) U.S. Cl. ............................. 410/92; 410/80; 410/77
(58) Field of Search ............................. 410/77, 80, 92; 244/118.1, 137.1; 414/536; 193/35 SS, 35 B, 35 TE, 35 MD; 198/782

(56) References Cited

U.S. PATENT DOCUMENTS

| | | | |
|---|---|---|---|
| 3,741,504 A | | 6/1973 | Alberti et al. |
| 3,814,233 A | * | 6/1974 | De Courcy |
| 4,081,157 A | * | 3/1978 | Petry |
| 4,234,278 A | * | 11/1980 | Harshman et al. ............. 410/69 |
| 4,349,302 A | * | 9/1982 | Ferguson, Jr. ................. 410/69 |
| 4,375,932 A | * | 3/1983 | Alberti ......................... 410/69 |
| 4,388,030 A | * | 6/1983 | Skaale ......................... 410/69 |
| 4,395,172 A | * | 7/1983 | Hoener et al. ................. 410/84 |
| 4,415,298 A | * | 11/1983 | Voigt ............................ 410/69 |
| 4,498,823 A | * | 2/1985 | Trautman ...................... 410/84 |
| 4,557,648 A | * | 12/1985 | Koch et al. ................... 410/78 |
| 4,583,896 A | * | 4/1986 | Vogg et al. .................... 410/69 |
| 4,706,793 A | * | 11/1987 | Masciarelli |
| 4,992,014 A | * | 2/1991 | Bock ............................ 410/52 |
| 5,090,638 A | | 2/1992 | Eilenstein-Wiegmanns et al. |
| 5,112,173 A | | 5/1992 | Eilenstein et al. ............. 410/79 |
| 5,184,366 A | * | 2/1993 | Rawdon et al. |
| 5,234,297 A | | 8/1993 | Wieck et al. .................. 410/77 |
| 5,302,065 A | | 4/1994 | Vogg et al. |
| 5,316,242 A | | 5/1994 | Eilenstein-Wiegmann et al. |
| 5,346,161 A | | 9/1994 | Eilenstein-Wiegmann et al. |
| 5,356,250 A | * | 10/1994 | Vogg et al. .................... 410/86 |
| 5,573,359 A | * | 11/1996 | Moradians ..................... 410/69 |
| 5,795,115 A | * | 8/1998 | Collins ......................... 410/22 |
| 5,816,758 A | * | 10/1998 | Huber ........................... 410/77 |
| 5,957,640 A | | 9/1999 | Schmieke et al. ............. 410/80 |
| 6,139,232 A | | 10/2000 | Niklas et al. .................. 410/80 |
| 6,193,043 B1 | * | 2/2001 | Langston et al. |
| 6,193,453 B1 | * | 2/2001 | Kernkamp ..................... 410/79 |
| 6,270,300 B1 | * | 8/2001 | Huber et al. ................... 410/69 |
| 6,315,508 B1 | * | 11/2001 | Nadon .......................... 410/80 |
| 6,450,744 B1 | * | 9/2002 | Gilhuys et al. ................ 410/69 |
| 6,488,457 B2 | * | 12/2002 | Diamante ...................... 410/84 |
| 6,516,934 B2 | * | 2/2003 | Masciarelli, Jr. |

FOREIGN PATENT DOCUMENTS

DE             4427696         2/1996

* cited by examiner

*Primary Examiner*—Stephen T. Gordon
(74) *Attorney, Agent, or Firm*—W. F. Fasse; W. G. Fasse

(57) ABSTRACT

A freight loading system for an aircraft includes roller drive units for transporting freight load units such as containers or pallets or the like, latching units for latching the freight load units, and control units for operating the drive units and/or the latching units. At least one of the roller drive units and the latching units is embodied as a pneumatically operated component including a pneumatic actuator. Pressurized air is supplied to the pneumatic components through a pressurized air line system. A pneumatic controller provides pneumatic control signals through pneumatic lines to the pneumatic components to achieve a purely pneumatic system, or an electric controller provides electric control signals over electric conductors to control valves for the pneumatic components to achieve a hybrid electro-pneumatic system. The sparking, overloading, and fire hazard problems of fully electric systems are avoided, and the weight, cost, and maintenance are reduced.

16 Claims, 4 Drawing Sheets

PNEUMATICALLY ACTUATED FREIGHT LOADING SYSTEM FOR AN AIRCRAFT

PRIORITY CLAIM

This application is based on and claims the priority under 35 U.S.C. §119 of German Patent Application 199 61 734.1, filed on Dec. 21, 1999, the entire disclosure of which is incorporated herein by reference.

FIELD OF THE INVENTION

The invention relates to a freight loading system for an aircraft, for loading and/or unloading freight load units, such as containers, pallets or the like, wherein the system includes roller drive units for transporting the freight, latching units for latching the freight, and control units for operating and controlling the roller drive units and/or the latching units.

BACKGROUND INFORMATION

In conventional freight loading systems, for example as described in German Patent 44 27 696, it is generally known to arrange roller drive units at a certain spacing distance apart from each other within roller tracks in the freight loading space of an aircraft. The roller drive units are coupled in a force-locking manner to the pieces of freight that are to be transported, such as freight containers, pallets or the like, in order to actively transmit a driving force to the respective freight pieces, so as to move them within the freight loading space of the aircraft. The conventional drive rollers of the roller drive units are electrically driven or actuated. These drive rollers suffer a very high wear. Also, due to the very high effective forces, which arise during normal freight transport operations and particularly also if a container is blocked, the drive rollers and the respectively associated electric motors are very often over-loaded and may thus be damaged. As a result, such roller drive units often fail and must be replaced or repaired, which leads to a high maintenance cost and effort.

Further problems arise through the use of electric components such as the above-mentioned electric motors respectively associated with each roller drive unit for driving the rollers, as well as electrical control, supply and switching arrangements. Such electrical components must all be protected against moisture and contamination, and must be electromagnetically shielded, in a complicated and costly manner. Furthermore, electrochemical corrosion arises, which also increases the sensitivity and likelihood of failure of the components.

In view of the high safety requirements onboard an aircraft, the use of such electric components in the freight compartment or cargo hold of an aircraft is necessarily burdened with a high maintenance, handling, inspection or monitoring, and control effort and expense. Nonetheless there always exists a possibility of danger, for example, electrical sparking or the starting of a fire due to a malfunction of an electrical component.

Moreover, since each roller drive unit must be respectively equipped with a driving electric motor, the great number of total roller drive units included in a typical aircraft freight loading system results in a high total weight of such a system, which is undesirable in an aircraft.

Several U.S. Patents disclose various features and embodiments of different conventional freight loading systems, such as U.S. Pat. Nos. 6,139,232; 5,957,640; 5,346,161; 5,316,242; 5,112,173; and 5,090,638; the disclosures of all of which are incorporated herein by reference to provide background information as well as a more complete understanding of the invention.

SUMMARY OF THE INVENTION

In view of the above, it is an object of the invention to provide a freight loading system for an aircraft, which makes it possible to load freight into and unload freight from the freight loading space, such as a freight compartment or cargo hold, of an aircraft, in a simple and robust manner. The invention aims to avoid or overcome the disadvantages of the prior art, and to achieve additional advantages, as apparent from the present specification. The invention particularly aims to avoid the dangers and disadvantages associated with using electric components for driving and controlling the roller drive units and the latching units of the freight loading system.

The above objects have been achieved according to the invention in a freight loading system for an aircraft, for loading and/or unloading freight loading units such as containers, pallets or the like, including roller drive units for transporting the freight units, latching units for latching the freight units, and at least one control unit for actuating and controlling the roller drive units and/or the latching units. Particularly according to the invention, at least one of the roller drive units and the latching units is embodied as a pneumatically operating or pneumatically actuated component. Further according to the invention, the system includes at least one pressurized air supply that provides pressurized air through a pressurized air line system to the at least one pneumatic component.

In the inventive system, it is especially advantageous that the dangers associated with sparking or fire generation from electrical devices is entirely avoided or significantly reduced. The use of pneumatic devices for the roller drive units and/or the freight latching units provides a robust, economical system. Overloading of individual components, or the damage, failure or disruption of any one or more of the individual components or pressurized air lines will not lead to a failure of the total pressurized air line system or network. Furthermore, the inventive freight loading system is not sensitive to moisture or contamination, and requires low maintenance. By minimizing or eliminating current-carrying conductors from the freight loading space of the aircraft, an electrochemical corrosion can be avoided, and electromagnetic effects that are incompatible with or interfere with other systems of the aircraft do not arise. By avoiding the use of electric motors for driving the roller drive units, the overall total system weight is reduced.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
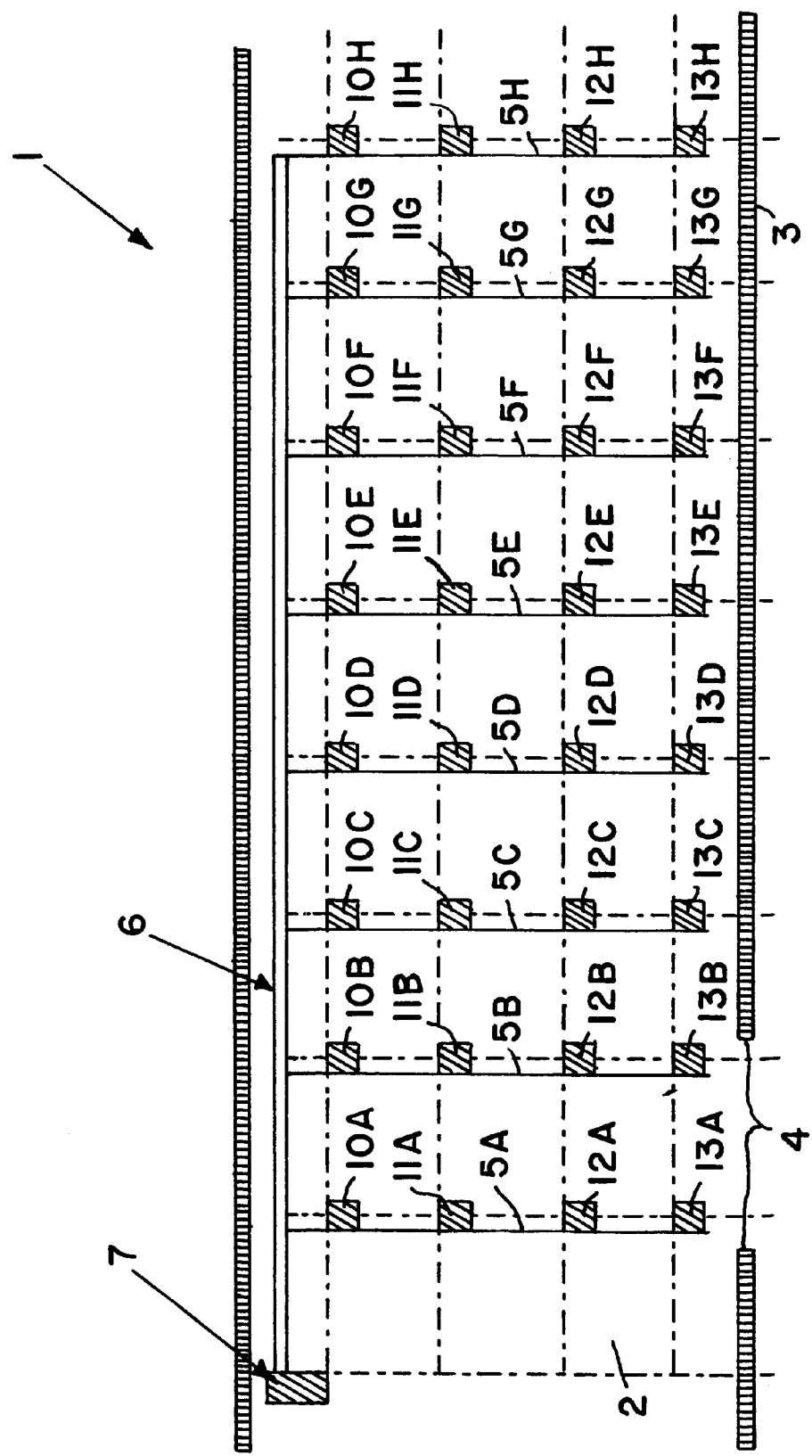
FIG. 1 is a schematic plan view of a first embodiment of a freight loading system for an aircraft according to the invention.

FIG. 1 schematically shows a top plan view of a first embodiment of a freight loading system 1, in terms of its layout within the freight compartment or cargo hold 2 of an aircraft. The freight compartment 2 is outwardly bounded by the corresponding structural components (not shown in detail) of the aircraft fuselage 3, whereby an opening 4 is provided through the fuselage 3 for accessing the freight compartment 2. The opening 4 is typically a freight loading doorway or hatch, which is closed by a freight loading door or gate when the process of loading or unloading freight or cargo load units such as containers, pallets, or the like has been completed. Throughout this application, the term "freight load unit" refers to any known unit for loading or unitizing freight or cargo, such as containers, pallets, totes, and the like. These freight loading units may have any conventionally known configuration and construction to be effectively used in connection with the inventive freight loading system 1.

The freight loading system 1 essentially comprises a plurality of pneumatically actuated components 10A to 10H, 11A to 11H, 12A to 12H and 13A to 13H. These pneumatically actuated components are preferably freight drive units and/or freight latching units, which are arranged on the floor of the freight compartment 2 in such a manner so that freight containers or other freight goods can be moved into and out of the freight compartment 2 as well as being selectively latched into place at the appropriate stowage locations. These freight drive units and freight latching units can have any conventionally known construction and configuration, except that the conventionally known electric actuators such as motors or the like, have been replaced by pneumatically operated rotational or linear actuators, such as pneumatic motors, piston-cylinder devices, bellows devices, and the like. The arrangement of these drive units and latching units on the floor of the freight compartment can also be in accordance with any conventionally known configuration and arrangement.

Figure 2:
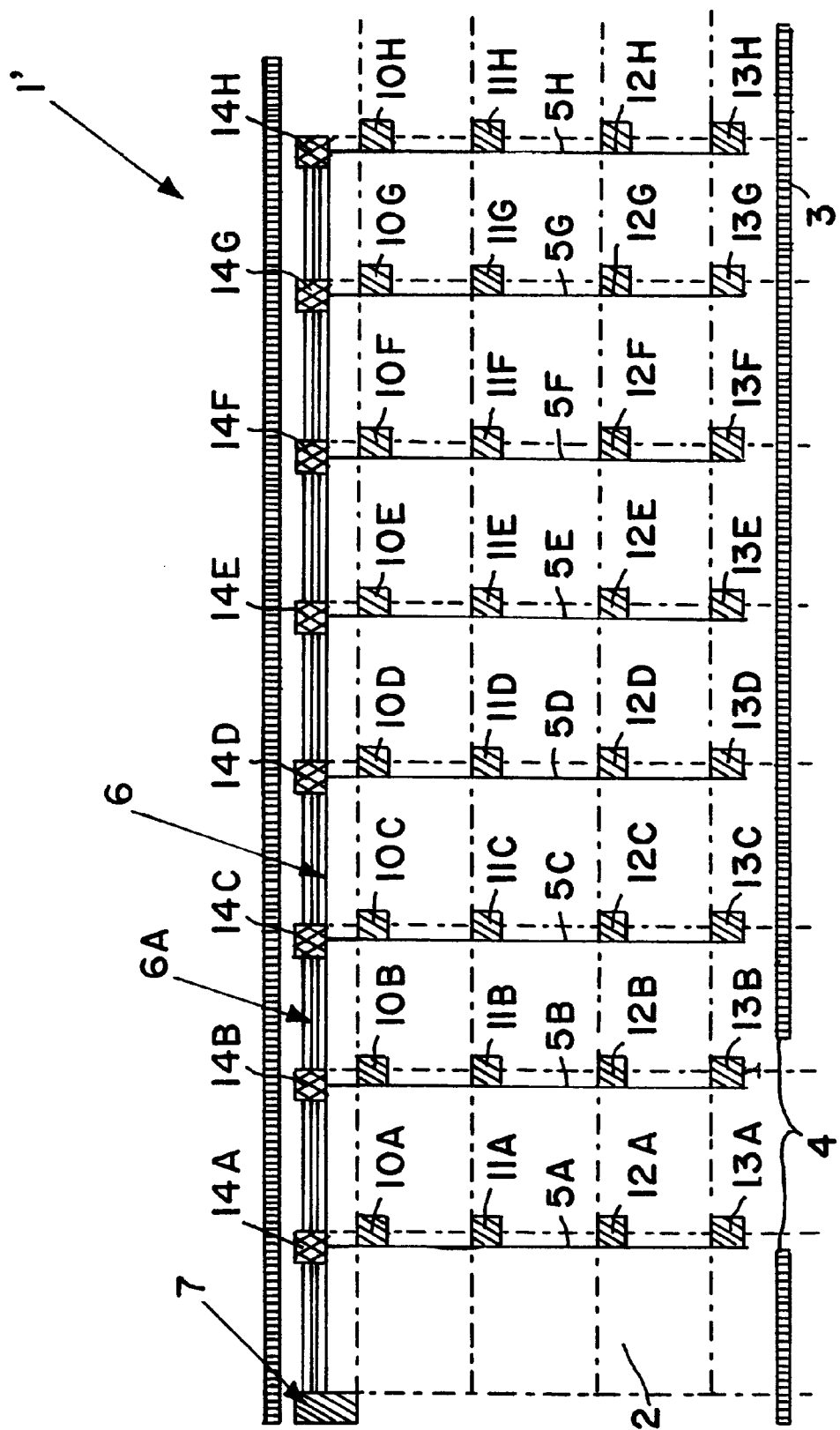
FIG. 2 is a schematic view similar to that of FIG. 1, but showing a second embodiment of a freight loading system according to the invention.
Figure 3:
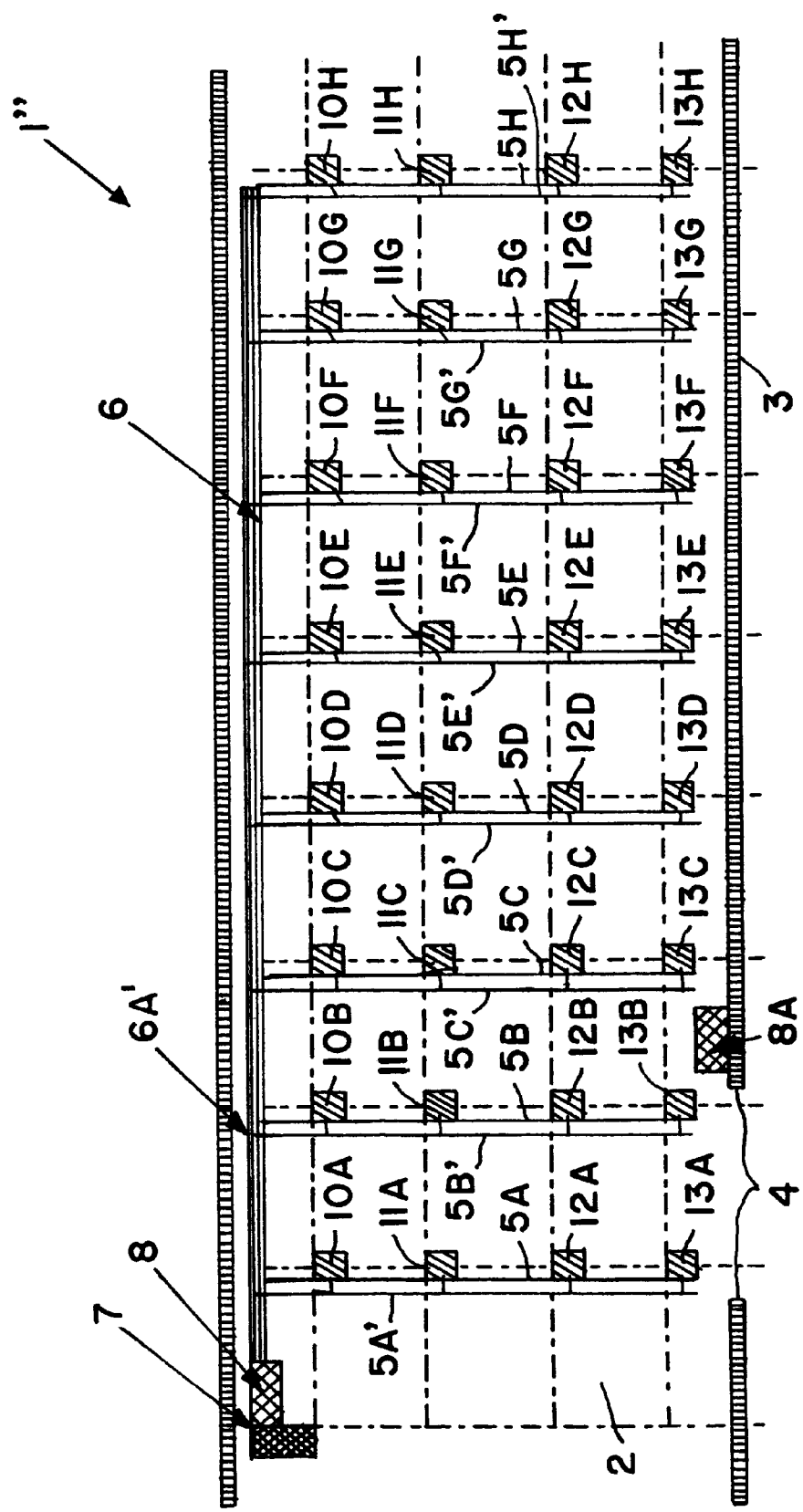
FIG. 3 is a schematic view similar to that of FIG. 1, but showing a third embodiment of a freight loading system according to the invention.

Furthermore, conventionally known roller ball mats or roller tracks are additionally arranged on the floor of the freight compartment 2, but are not shown in the simplified principle illustrations of FIGS. 1 to 3, for the sake of clarity and simplicity. These roller ball mats or roller tracks can be embodied according to any conventionally known teachings, as they are used in typical prior art freight loading systems.

The components 10A to 10H, 11A to 11H, 12A to 12H and 13A to 13H are arranged at regular spacing distances apart from one another, so that at least one drive unit is always in contact with the respective freight load unit such as a freight container. Thus, the spacing distance between the drive units is determined based on the standardized container sizes. The latching units are similarly arranged at the spacing distances apart from one another and at particular locations depending on the freight load unit sizes and configurations, in order to provide a sufficient number of latching units for each respective stowage or loading location for a freight container.

It is possible that only the drive units are embodied as pneumatically driven or actuatable components 10A to 10H, 11A to 11H, 12A to 12H and 13A to 13H, while manually or mechanically operable latching units are used for latching the containers or other freight loading units in place. Alternatively, both the drive units and the latching units may be pneumatically actuated units, or only the latching units may be pneumatically operated. To achieve this, as mentioned above, any conventionally known configuration or construction of drive units and latching units may be used in connection with any pneumatic actuators or pneumatic motors, which are also conventionally known as such.

In order to provide pressurized air to the pneumatically driven or actuated components 10A to 10H, 11A to 11H, 12A to 12H and 13A to 13H, the present freight loading system 1 includes a pressurized air main line 6, and respective individual pneumatic branch lines 5A, 5B, 5C and 5D to 5H that respectively branch off from the main line 6 and provide a connection to each of the individual components 10A to 10H, 11A to 11H, 12A to 12H and 13A to 13H.

Pressurized air is provided by at least one pneumatic aggregate or compressed air plant 7 and supplied into the main line 6. The pneumatic aggregate or compressed air plant 7 may comprise any one or more of compressors, pressurized air reservoirs, or a connection to an external compressed air supply such as a compressor on a ground-based aircraft service vehicle. It is also possible to provide the required pressurized air as engine bleed air from the compressor stages of the engines present in the aircraft through a bleed air line connected thereto. As a further variation, a plurality of separate pressurized air sources or connections may be provided distributed throughout the freight compartment 2 at different locations, or at least in a redundant parallel connection, in order to ensure the availability of at least a second pressurized air supply in the event of the failure of a first pressurized air supply.

Figure 1A:
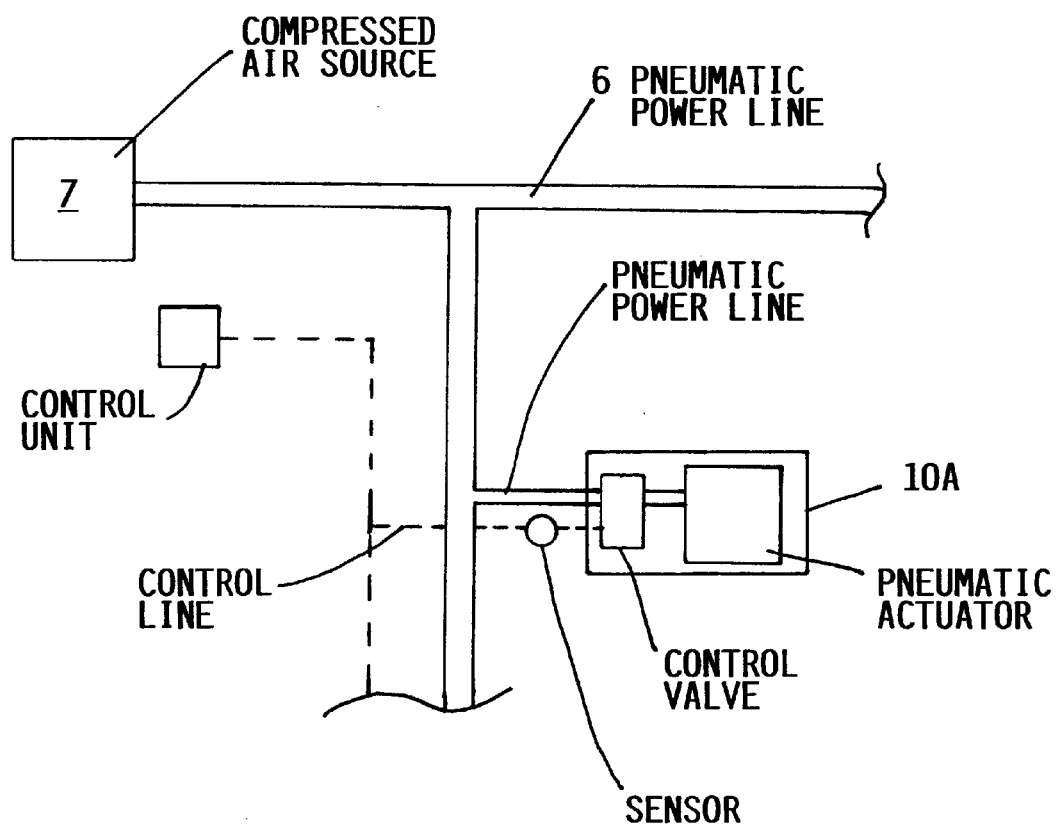
FIG. 1A is a schematic view of a detail portion of the freight loading system of FIG. 1.

As shown especially in FIG. 1A, each one of the pneumatically actuated or operated components 10A to 10H, 11A to 11H, 12A to 12H and 13A to 13H further includes or is respectively associated with and connected to an allocated control valve, in order to control the supply of pressurized air to the pneumatic actuator of the respective component, so as to switch on and switch off the respective drive unit as needed, or to latch or unlatch the respective latching unit as needed. The respective control valve of a respective drive unit may be connected to and receive sensor signals transmitted from a floor-mounted sensor that is mounted in or on the freight compartment floor of the freight compartment, and that obtains and provides the corresponding necessary information for switching on the drive, for example when a freight container has been pushed by a preceding drive unit onto the respective drive unit which is then actuated by the corresponding sensor. This drive unit may then be switched off when the sensor or sensors sense that the respective container is no longer standing on the drive rollers of the respective drive unit, i.e. the container has been moved along onto the next drive unit. On the other hand, if the container has reached its final intended stowage or latching position and thus remains on the respective drive unit, the drive unit can be switched off after operating for a prescribed period of time, or by actuating a manual switch that indicates the container has reached its desired location.

The respective components may be actuated or driven in a dual-actuation or two-directional manner. Namely, the drive units may be selectively pneumatically driven in a forward direction or a reverse direction, and the latching units may be actively latched and unlatched by the pneumatic actuation. Alternatively, the components may be pneumatically driven in one direction only. For example, the latching units may be pneumatically actuated into an open or unlatched condition, while a spring or a gravitational imbalance condition tends to urge the latch into the closed or latched position when the pressurized air is not supplied thereto.

By using pneumatically driven or actuated components for the drive units and the latching units in the freight compartment 2 of an aircraft, the need for providing an electrical power supply of 115 volts within the aircraft freight compartment 2 is avoided, whereby considerable dangers that arise from overloading of devices with consequent overheating or sparking, moisture sensitivity, and possible disruption of current-carrying conductor lines leading to short-circuits in the system or current spark-overs and the like, are avoided. Moreover, there is no danger of an electrochemical corrosion, and the generation of undesired electromagnetic fields is prevented.

FIG. 2 schematically shows a second embodiment of a freight loading system 1' according to the invention. The essential components of this freight loading system 1' correspond to those of the first embodiment of the freight loading system 1 shown and described in connection with FIG. 1. The major difference relative to the first embodiment is that the present freight loading system 1' comprises separately arranged control valves 14A to 14H, whereby each respective one of these control valves controls a corresponding associated row of the pneumatic components, such as a first row of components 10A, 11A, 12A, 13A, or a second row of components 10B, 11B, 12B and 13B, etc. Thus, the letter suffix of the reference number for a respective one of the control valves corresponds to the letter suffix of the reference number for the pneumatic components of the associated row of components. This is achieved in that each row of pneumatic components is connected to a given one of the pneumatic lines 5A to 5H, which is connected via a respective corresponding one of the control valves 14A to 14H to the pneumatic main line 6.

Thus, starting from the pneumatic aggregate or compressed air plant 7, and then through the pneumatic main line 6, the pressurized air is supplied through the respective pneumatic control valves 14A to 14H into the pneumatic lines 5A to 5H, selectively as needed, to pneumatically actuate the individual pneumatic components connected to each one of the pneumatic lines. Since a respective control valve 14A to 14H is provided only respectively for each stowage location row, it follows that the pneumatic components 10A to 10H, 11A to 11H, 12A to 12H and 13A to 13H may also only be actuated in a row-by-row manner. This is usually adequate in most situations, because the drive units and the latching units will operate substantially in common or in unison along an entire row as a freight container or freight containers or the like is or are moved along the loading floor of the freight compartment into the final stowage position or positions.

The control valves 14A to 14H can in turn be controlled via electronic control lines 6A which are typically energized with a control voltage of 28 volts. By providing individual electronic control lines 6A for each respective one of the control valves 14A to 14H, each respective row of pneumatically actuated components can be selectively actuated. The control line or lines 6A are connected to and activated by an appropriate electronic control unit that may be arranged and connected in any desired manner to achieve the appropriate actuation.

Since the present second embodiment of a freight loading system 1' uses electronic control lines 6A with a control voltage of 28 volts, in combination with pneumatic lines and pneumatically actuated devices, the present embodiment realizes an electro-pneumatically functioning freight loading system 1'. In contrast to a conventional purely electrical freight loading system, which must provide electrical power at a relatively high voltage, e.g. 115 volts, to provide the necessary motive power, the present electro-pneumatic freight loading system 1' uses rather low control voltages and control currents, not for driving the drive units and latching units, but merely for operating and controlling the pneumatic control valves. For this reason, the above described problems of electromagnetic interference and electrochemical corrosion suffered by purely electrical freight loading systems, are minimal in the present inventive system. Also, the control lines 6A are arranged only along the outside edge zones of the freight compartment 2, which are relatively protected from heavy loads and possible damage that might be caused by the heavy freight containers. Thus, the above described dangers resulting from disruption or overloading and overheating of electrical devices are not possible in the present inventive system. Furthermore, electric motors as the drives for the roller drive units are not needed in the present embodiment, so the problems of wear and additional weight associated with such electric motors are avoided.

FIG. 3 shows a third embodiment of a freight loading system 1" according to the invention. The essential components of this freight loading system 1" correspond to those shown and described above in the first embodiment in connection with FIG. 1. The primary distinction relative to the first embodiment is that the present freight loading system 1" further includes a central control unit 8, as well as control lines, which are preferably pneumatic control lines 6A' and 5A' to 5H' that lead from the control unit 8 to the respective pneumatic components 10A to 10H, 11A to 11H, 12A to 12H and 13A to 13H. The control unit 8 can preferably be arranged close to the pneumatic aggregate or compressed air plant 7 in order to achieve a simple arrangement of pressurized air lines and control lines. Namely, in this arrangement, both the pressurized (power) air lines 6 and 5A to 5H, as well as the pneumatic control lines 6A' and 5A' to 5H' lead respectively from the pneumatic aggregate 7 and the control unit 8 to the respective pneumatic components 10A to 10H, 11A to 11H, 12A to 12H and 13A to 13H. Thereby, the pressurized air supply lines 6 and 5A to 5H still provide the pressurized air that actually powers the operation of the pneumatic components with a sufficient pressure and air flow volume, while the pneumatic control lines merely provide control signals in the form of pneumatic signals. Alternatively, the control unit 8A may be arranged close to the freight loading door or opening 4, so that the control unit 8A may be conveniently accessed and operated by freight loading personnel who are carrying out the freight loading process.

This third embodiment of the freight loading system 1", with the pneumatically acting control lines 6A' and 5A' to 5H' leading from a central pneumatic control unit 8 or 8A, represents a purely pneumatically operating freight loading system according to the invention. In this embodiment, no electrical devices or current-carrying lines or the like are provided in the freight compartment 2 at all, so that all of the above mentioned dangers and disadvantages of such electrical conductors and devices can be avoided.

As a further alternative embodiment of the invention, only some of the drive units and latching units may be embodied as pneumatic components while other individual components are still embodied as electrically operating components, or only the drive units and latching units in certain areas of the freight loading system are pneumatically operated while the components in other areas of the freight loading system are embodied as electrically operated components according to the prior art. For example, the drive units and/or latching units in the entry area of the freight compartment, which are subjected to a high demand for drive power, or in areas in which the typical conventional roller drive units have been found to suffer rapid wear or overloading, can be embodied as pneumatic drive units and/or pneumatic latching units according to the invention. With such a partial or area-wise utilization of pneumatic components, it is still possible to achieve considerable reduction of maintenance requirements and of the danger posed by electrical components, especially in certain areas of the freight compartment. It is also very easy to retrofit the inventive system into existing aircraft.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In an aircraft freight loading system for loading or unloading freight load units, including roller drive units adapted to transport the freight load units, latching units adapted to latch the freight load units at selected stowage locations, and at least one control unit connected to at least one of said roller drive units and said latching units for control signal transmission thereto, an improvement wherein at least one of said roller drive units is a respective pneumatically operable unit comprising a pneumatic actuator adapted and arranged to rotationally drive a drive roller of said roller drive unit, and wherein said improvement in said system further comprises a pressurized air supply and a pressurized air line system connecting said pressurized air supply to said pneumatically operable unit.

2. The improvement in the aircraft freight loading system according to claim 1, wherein said pneumatically operable unit further comprises a control valve that is directly adjoining and connected to said pneumatic actuator and that is interposed between said pressurized air line system and said pneumatic actuator.

3. The improvement in the aircraft freight loading system according to claim 2, wherein said freight loading system further includes a freight compartment bounded by a freight compartment floor, and wherein said improvement further comprises a sensor that is mounted in or on said freight compartment floor and that is connected to said control valve for sensor signal transmission thereto.

4. The improvement in the aircraft freight loading system according to claim 1, wherein said pressurized air line system comprises a main line and plural branch lines, said improvement further comprises a plurality of control valves respectively interposed and interconnected between said branch lines and said main line, and said branch lines are each respectively connected to at least one said respective pneumatically operable unit.

5. The improvement in the aircraft freight loading system according to claim 4, wherein said improvement includes a respective plurality of said pneumatically operable units respectively connected in a row along each respective one of said branch lines.

6. The improvement in the aircraft freight loading system according to claim 5, further comprising electrical control signal conductors connected to said control valves and adapted to conduct electrical control signals to said control valves.

7. The improvement in the aircraft freight loading system according to clam 1, wherein said improvement comprises a plurality of said pneumatically operable units, and wherein said control unit comprises a central control unit, and further comprising control lines connecting said central control unit respectively to said pneumatically operable units for control signal transmission thereto.

8. The improvement in the aircraft freight loading system according to claim 7, wherein said central control unit is adapted to provide pneumatic signals as control signals, and said control lines are respective pneumatic lines adapted to convey said pneumatic signals.

9. The improvement in the aircraft freight loading system according to claim 1, wherein said pressurized air supply comprises at least one of a compressor, a pressurized air reservoir, and a pressurized air connector adapted to be connected to an external source of pressurized air.

10. The improvement in the aircraft freight loading system according to claim 1, in combination with an aircraft including an engine having a compressor stage, and wherein said pressurized air supply comprises a bleed air line connected to said compressor stage and adapted to convey pressurized engine bleed air from said compressor stage of said engine to said pressurized air line system.

11. The improvement in the aircraft freight loading system according to claim 1, wherein at least one of said latching units is a further pneumatically operable unit comprising a further pneumatic actuator adapted to actuate said latching unit, and said pressurized air line system further connects said pressurized air supply to said further pneumatically operable unit.

12. The improvement in the aircraft freight loading system according to claim 1, wherein at least one other one of said roller drive units and said latching units is a respective electrically operable unit comprising an electric actuator.

13. The improvement in the aircraft freight loading system according to claim 12, comprising a plurality of said electrically operable unit and a plurality of said pneumatically operable unit.

14. The improvement in the aircraft freight loading system according to claim 1, wherein said system is a purely pneumatically operated system that does not include any electrical devices and does not include any electrical conductors.

15. The improvement in the aircraft freight loading system according to claim 1, wherein said system is a hybrid electro-pneumatic system, wherein said control unit is an electrical control unit.

16. An aircraft freight loading system for loading or unloading a freight load unit into or out of an aircraft, comprising:

a latching unit adapted to latch the freight load unit at a selected stowage location;

a roller drive unit including a drive roller adapted to rotate so as to transport the freight load unit in contact therewith, and including a pneumatic actuator coupled to said drive roller so as to rotationally drive said drive roller;

a pressurized air supply adapted to provide pressurized air; and a pressurized air line system connecting said pressurized air supply to said pneumatic actuator so as to power said pneumatic actuator with said pressurized air.

* * * * *